United States Patent
Pellegrin (10) Patent No.: US 6,616,733 B1
(45) Date of Patent: Sep. 9, 2003

(54) METHOD AND MEANS FOR FILTERING AN AIR STREAM WITH AN AQUEOUS FROTH

(75) Inventor: Roy J. Pellegrin, Wailuku, HI (US)

(73) Assignee: Peletex, Inc., Maui, HI (US)

( * ) Notice: Subject to any disclaimer, the term of this patent is extended or adjusted under 35 U.S.C. 154(b) by 0 days.

(21) Appl. No.: 09/889,235
(22) PCT Filed: Jul. 10, 2001
(86) PCT No.: PCT/US00/27771
§ 371 (c)(1), (2), (4) Date: Jul. 10, 2001
(87) PCT Pub. No.: WO01/24909
PCT Pub. Date: Apr. 12, 2001

Related U.S. Application Data
(60) Provisional application No. 60/158,579, filed on Oct. 7, 1999.

(51) Int. Cl.[7] ............................................. B01D 47/02
(52) U.S. Cl. ............................ 95/150; 95/226; 95/241; 96/176; 96/279; 96/340; 96/342
(58) Field of Search ......................... 96/279, 340, 344, 96/353, 176, 269, 278, 342, 351; 95/226, 150, 241

(56) References Cited

U.S. PATENT DOCUMENTS

| | | | |
|---|---|---|---|
| 1,994,766 A | * | 3/1935 | Heglar |
| 2,250,226 A | * | 7/1941 | Juelson |
| 2,379,338 A | * | 6/1945 | Bingman |
| 2,379,396 A | * | 6/1945 | Ziliotto |
| 2,405,494 A | * | 8/1946 | Dupuy |
| 3,018,843 A | * | 1/1962 | Mercier |
| 3,155,472 A | * | 11/1964 | Huppke |
| 3,231,251 A | * | 1/1966 | Scheibel |
| 3,405,508 A | * | 10/1968 | Peters et al. |
| 3,811,247 A | * | 5/1974 | Huppke |
| 3,830,041 A | * | 8/1974 | Huppke |
| 3,963,463 A | * | 6/1976 | Huppke |
| 3,989,488 A |   | 11/1976 | Wisting |
| 4,000,992 A | * | 1/1977 | Cole, Jr. |
| 4,003,724 A | * | 1/1977 | Payne et al. |
| 4,116,648 A |   | 9/1978 | Busch |
| 4,400,220 A | * | 8/1983 | Cole, Jr. |
| 4,484,513 A |   | 11/1984 | Napadow |
| 4,818,259 A | * | 4/1989 | Marano |
| 4,874,404 A | * | 10/1989 | Boswell |
| 4,956,077 A |   | 9/1990 | Barwise |
| 5,199,963 A |   | 4/1993 | Scarp |
| 5,261,933 A | * | 11/1993 | Greene |
| 5,428,865 A |   | 7/1995 | Yarbrough |
| 5,518,701 A | * | 5/1996 | Berthold |
| 5,669,946 A |   | 9/1997 | Blair, Jr. |
| 5,820,657 A |   | 10/1998 | Driker et al. |
| 6,083,307 A | * | 7/2000 | Dular |

* cited by examiner

Primary Examiner—Duane S. Smith
(74) Attorney, Agent, or Firm—Bruce H. Johnsonbaugh (57) ABSTRACT

A method and apparatus for filtering an air stream with an aqueous froth are provided. The process includes: passing a contaminated air stream through a diffusing sieve, into an aqueous solution in an expansion chamber; generating, maintaining, and containing an aqueous froth between the liquid-bath reservoir and a saturated fiber element; and continually saturating a coarse-fiber element with liquid from the aqueous solution. The froth is generated and maintained, and the fiber element is saturated, by controlling the dynamic interface between the contaminated air stream and the liquid-bath reservoir. The apparatus for filtering an air stream includes: an air filter device that incorporates a liquid-bath filter initial stage; an aqueous-froth filter second stage; a constantly saturated, coarse-fiber filter as a combined third stage and froth-limiter; and a moist, fine-fiber filter as the final stage.

5 Claims, 5 Drawing Sheets

METHOD AND MEANS FOR FILTERING AN AIR STREAM WITH AN AQUEOUS FROTH

CROSS REFERENCES TO RELATED APPLICATIONS

This application claims the benefit of and priority from U.S. provisional patent application No. 60/158,579 filed Oct. 7, 1999 and entitled METHOD AND MEANS FOR FILTERING AN AIRSTREAM WITH AN AQUEOUS FROTH.

BACKGROUND AND SUMMARY OF THE INVENTION

Generally, the invention of the application provides a method and a means, utilizing an aqueous froth, for filtering an air stream. More specifically, the invention provides a method of removing volatile or inert gaseous, liquid, and solid contaminants from an air stream. The invention also provides a liquid-bath, froth-filtered, saturated-fiber air filter device for removing contaminants from an air stream. The invention is also effective in removing abraded drywall joint compound dust from an air stream.

Nuisance dust is any particulate that is micron/sub-micron in size, and small enough to pass through dry air filter elements. Nuisance dust is generated by natural and artificial means. Examples of natural dust include wind-blown sediments and evaporates, pollen, microscopic organic detritus, allergens, and ash from fires and volcanic eruptions. Artificially caused dust includes acid rain, industrial emissions, vehicle exhaust, mining and construction processes, man-made fires, inadequate soil management, paint, fertilizer, and other chemical sprays.

The prior art includes the Dular U.S. Pat. No. 6,083,307 dated Jul. 4, 2000, which teaches an apparatus for separating sanded drywall joint compound from an air stream. Dular does not teach the use of an aqueous froth and does not teach the use of radially extending filters that cooperate with the aqueous froth.

The prior art also includes the Driker et al U.S. Pat. No. 5,820,657 dated Oct. 13, 1998, which teaches a percolating vacuum system. Driker et al is concerned primarily with uninterrupted conversion from wet-to-dry or dry-to-wet vacuuming, which requires the use of a cumbersome deflector and float mechanism. The present invention avoids the deflector and float apparatus of Driker et al. Furthermore, the present invention provides additional filtering stages using wetted fiber filters that cooperate with and enhance the aqueous froth filtration.

The prior art includes dry filter methods for improving micron/sub-micron sized particulate filtration as disclosed in Busch, U.S. Pat. No. 4,116,648.

The prior art also uses water as a micron/sub-micron filter media. Water reservoirs, cascades, sprays, and cyclones are incorporated in air scrubbing devices large and small as shown in Napadow U.S. Pat. No. 4,484,513.

The Wisting U.S. Pat. No. 3,989,484 teaches a cyclone-type air scrubber and filters with a liquid reservoir by introducing the contaminated air stream either above or below the surface of the liquid reservoir.

Yarbrough U.S. Pat. No. 5,428,865 projects particulate onto a water surface in an air chamber, but all the contaminate is not exposed to filtering surfaces, leaving unfiltered contaminate in the air stream.

Blair U.S. Pat. No. 5,669,946 uses plastic members to increase water surface. Blair recognized the need to increase the water-surface filter area. However, mechanical members limit the filtering surfaces to a predetermined area, take up space in the waste receptacle, and add to manufacturing cost.

Another prior art approach introduces the contaminated air stream below the surface of a water reservoir. Mechanical circulators, baffles, and collectors channel the contaminated air stream into a circuitous path, exposing the contaminant to the surfaces of the container, collecting the liquid and returning it to the reservoir. The baffles, circulators and collectors add extra parts to the device, raising manufacturing costs and reducing reliability.

For example, Scarp U.S. Pat. No. 5,199,963 teaches cyclone-type, mechanical ring baffles and fluid collecting rings to channel air into a circuitous path to collect and return water to a reservoir.

Aqueous froths are used in the prior art as a flotation means, usually to float mineral fines out of a slurry, and transport the fines to a containment vat where they are removed from the froth by various de-watering methods, as disclosed by Barwise U.S. Pat. No. 4,956,077.

During the process of finishing drywall, sanding joint compound generates nuisance dust that is difficult to contain and clean up. This nuisance dust is approximately 300 times smaller than the diameter of a human hair and readily passes through standard vacuum-cleaner filtering elements. Cleaning up the dust is costly and often extensive masking is required to prevent the dust, generated by the sanding process, from contaminating restricted areas. Such specific applications require an effective, efficient means for removing sub-micron contaminate from a vacuum air stream. Working in dust restricted areas, such as occupied homes, hospitals, computer centers, restaurants, office buildings, retail stores, art galleries, and hotels, where dust contamination is unacceptable, requires a more efficient solution.

It is applicant's objective to provide an effective method and means of removing micron/sub-micron contaminants from an air stream, that is easy to clean, economical to manufacture and use, and durable and dependable enough for professional service. The present invention performs well in dust-restricted areas.

The dynamic interface between a contaminated air stream and an aqueous solution is exploited in one form of the invention to generate an aqueous froth with an exponential number of filtering surfaces. Turbulence generated in the aqueous solution, by the dynamic interface, is utilized to continuously saturate a fiber element. The saturated-fiber element establishes the upper boundary of the froth filter and adds a plurality of wet fiber surfaces providing an additional filtering stage to remove the contaminate not removed by the aqueous froth. The effects of gravity are exploited: adding to the momentum of the contaminate toward the bottom of the aqueous solution; to contain the dynamic froth environment in the scrubbing chamber; and to settle the contaminate out of solution, by alluvial sedimentary process. Another form of the invention generates the aqueous froth with clean air from a secondary source.

The aqueous froth is generated by exhausting a contaminated air stream through a diffusing sieve into a water column and exposing the contaminate to the inside and outside surfaces of the plurality of bubbles generated in the liquid reservoir. The air stream and any remaining contaminate are then exposed to a continuously saturated fiber element, exposing the contaminate to the plurality of the wet fibers of the element.

Contact between the contaminants in the air stream and the liquid surfaces of the aqueous froth is the primary means of transfer of contaminants from the air stream to the aqueous solution. Water is cost effective and widely available, replaced every time the filter is cleaned. There is no cost beyond the initial purchase of the filter.

Designed for easy cleaning, the air filter reduces the volume of unconsolidated contaminate to a volume consistent with an alluvial sedimentary deposit of clay. The cover assembly of the water reservoir container is removed and the sludge is hosed out of the container. The operator removes the pipe/fiber-element assembly from the fiber-element container and hoses the fiber elements until the water runs clear. The water reservoir container is filled to a predetermined level, the water reservoir cover assembly and the pipe/fiber-element assembly are replaced and the filter is ready for use.

The air filter has no moving parts, air and water are the only moving elements. All components are suitable polymeric compositions. The selected polymers constitute a durable filtration device that will provide years of economical, dependable service. The air filter of the present invention may be used as a pre-filter, in a condition of partial vacuum. The contaminated air stream is drawn by means of low pressure through the filter, discharging the decontaminated air stream into the vacuum hose toward the vacuum source.

The filter may be used as an exhaust filter in a condition of positive pressure. The contaminated air stream is urged through the filter by relative high pressure of the air stream, exhausting the decontaminated air stream into the atmosphere.

Additives to the liquid reservoir can increase surface tension, to increase froth duration and improve filtration; to act as a solvent, to remove contaminants from the air stream that are not water soluble; to act as a base, to neutralize acid contaminants; and to act as an pathogen, to sterilize organic-allergen contaminants.

The contaminated air stream is drawn through the aqueous solution by means of partial vacuum and into contact with the aqueous surfaces of the froth in the scrubbing chamber. Simultaneously, the turbulence generated by the interface continuously saturates a fiber element positioned a predetermined distance above the water surface. The saturated-fiber element effectively contains the expansion of the aqueous-froth filter. The air stream is drawn into contact with the saturated fiber element removing any remaining contaminate. Excess water rinses the contaminant from the fibers, back into the liquid reservoir continuously. The air stream is optionally drawn through a secondary fine fiber element, and returned to the vacuum line toward the vacuum source.

Other objects and advantages of the invention will become apparent from the following detailed description and drawings.

DETAILED DESCRIPTION OF THE DRAWINGS

In the following description, specific material compositions are representative of the preferred embodiment only, and should not limit the scope of the invention.

The preferred embodiment of the air filter device is used by applicant professionally as a pre-filter for a vacuum cleaner, in combination with a vacuum sanding pole, for finishing gypsum wall panels. The function of the filter device is to remove gypsum dust, abraded during the process of sanding joint compound, from the vacuum air stream, before the dust passes through the filter-elements of the utility-vacuum cleaner and into the atmosphere of a restricted environment. A percentage of the gypsum dust is micron/sub-micron in size, requiring an efficient, effective means for removing micron/sub-micron sized particulate when working in a dust restricted area.

Figure 1:
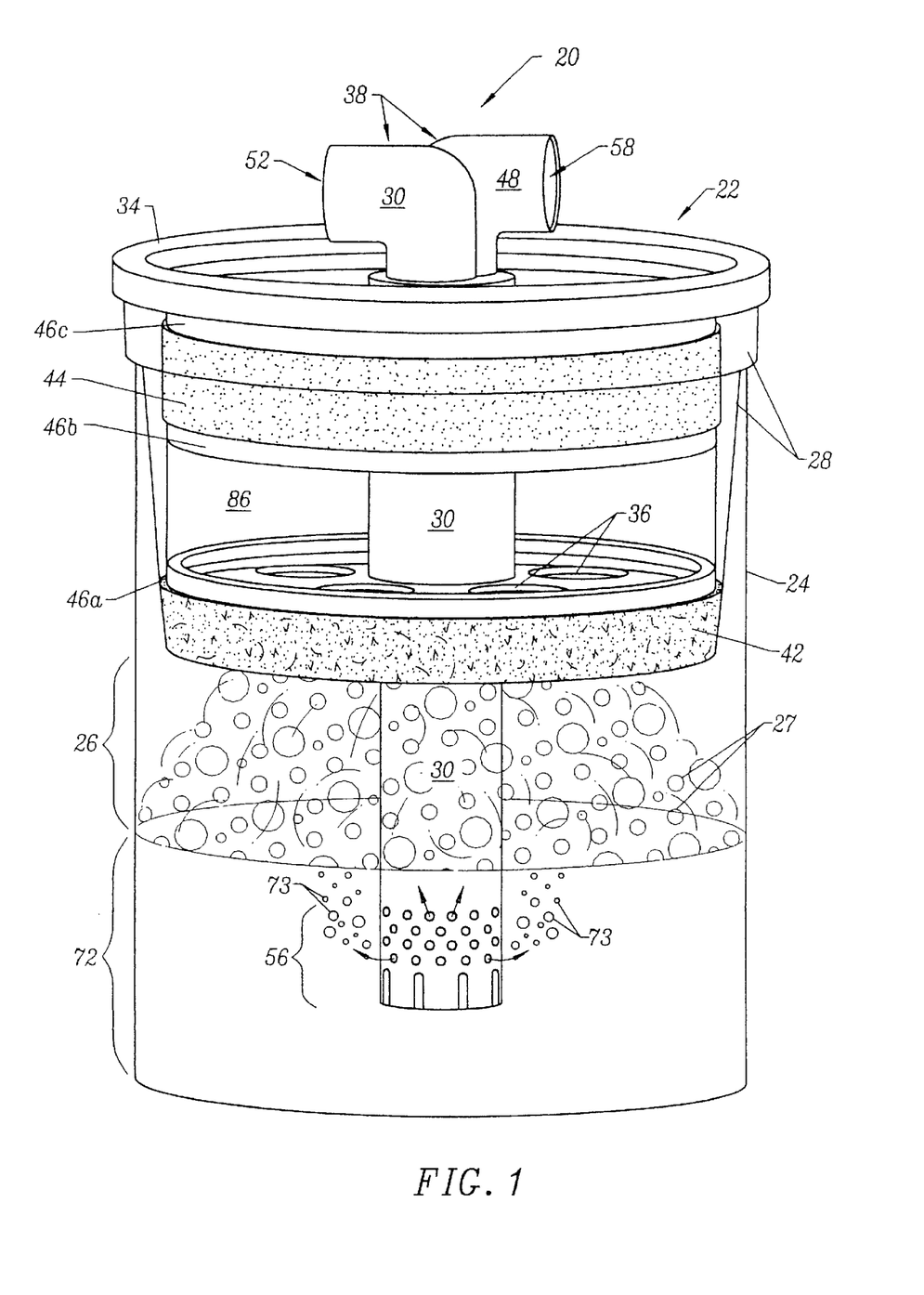
FIG. 1 is a perspective view of a filter according to the invention, with a portion of the apparatus broken away for clarity.

The air filter device 20 FIG. 1 of the application includes: a generally cylindrical, reservoir container 24, having one open end at the top, of sufficient volume to contain a liquid reservoir 72, an aqueous-froth scrubbing chamber 26, and the volume of a fiber-element container 28. Said reservoir container 24 functions as an expansion chamber in relation to the cross-sectional area of an inlet pipe 30. Said liquid reservoir 72 is proportionally of sufficient volume to absorb the energy in an introduced air stream, in a turbulent upper reservoir portion 26, and maintain a relatively calm, lower reservoir portion 72 of sufficient volume to allow massive particulate to settle out of solution and into an alluvial deposit on the bottom of the container 24. The air filter 20 shown in FIG. 1 was developed to enable drywall professionals to contain nuisance dust on dust-restricted job-sites with no construction cleaning facilities. An example is an exclusive hotel or a high rise condominium on an environmentally sensitive resort beach. Such establishments have self-contained waste-water treatment facilities. Restrictions prohibit introducing any contaminant into the treatment facilities. Therefore, a means for containing abraded drywall-joint compound was required that would function effectively for as long as necessary, when the equipment could be cleaned at a suitable time and place.

The reservoir container 24 is a standard five-gallon bucket that originally held drywall-joint compound. The fiber-element container 28 is proportioned diametrically to fit in the open top of the joint-compound bucket 24. Several buckets 24 are filled with water to a predetermined volume. The air filter container 28 is urged into the open top of joint-compound bucket 24 to maintain pressure integrity of the filter. The joint-compound is sanded and the abraded dust settles out into a sludge layer on the bottom of the joint-compound bucket 24. When the filter requires cleaning, it is removed and the top of the bucket 24 is sealed. The filter assembly is placed in another joint-compound bucket 24 with a predetermined volume of clean water. The fresh water clears the filter assembly as it is used and the process can be repeated as necessary. The sealed buckets 24 can be cleaned with the air filter assembly and other tools at a suitable time and place.

A fiber-element container assembly 28 includes: a cover 34, removably attached and co-extensive with the open top of said fiber element container 28 and friction-fit tight enough to maintain the pressure integrity of said container 28. Said fiber-element container 28, generally cylindrical, having one end open at the top, the opposite bottom end having a plurality of portals 64 (FIG. 2), through the thickness dimension of the container bottom, said portals 64 establishing a fluid communication between said reservoir container 24 and said fiber-element container 28.

Figure 2:
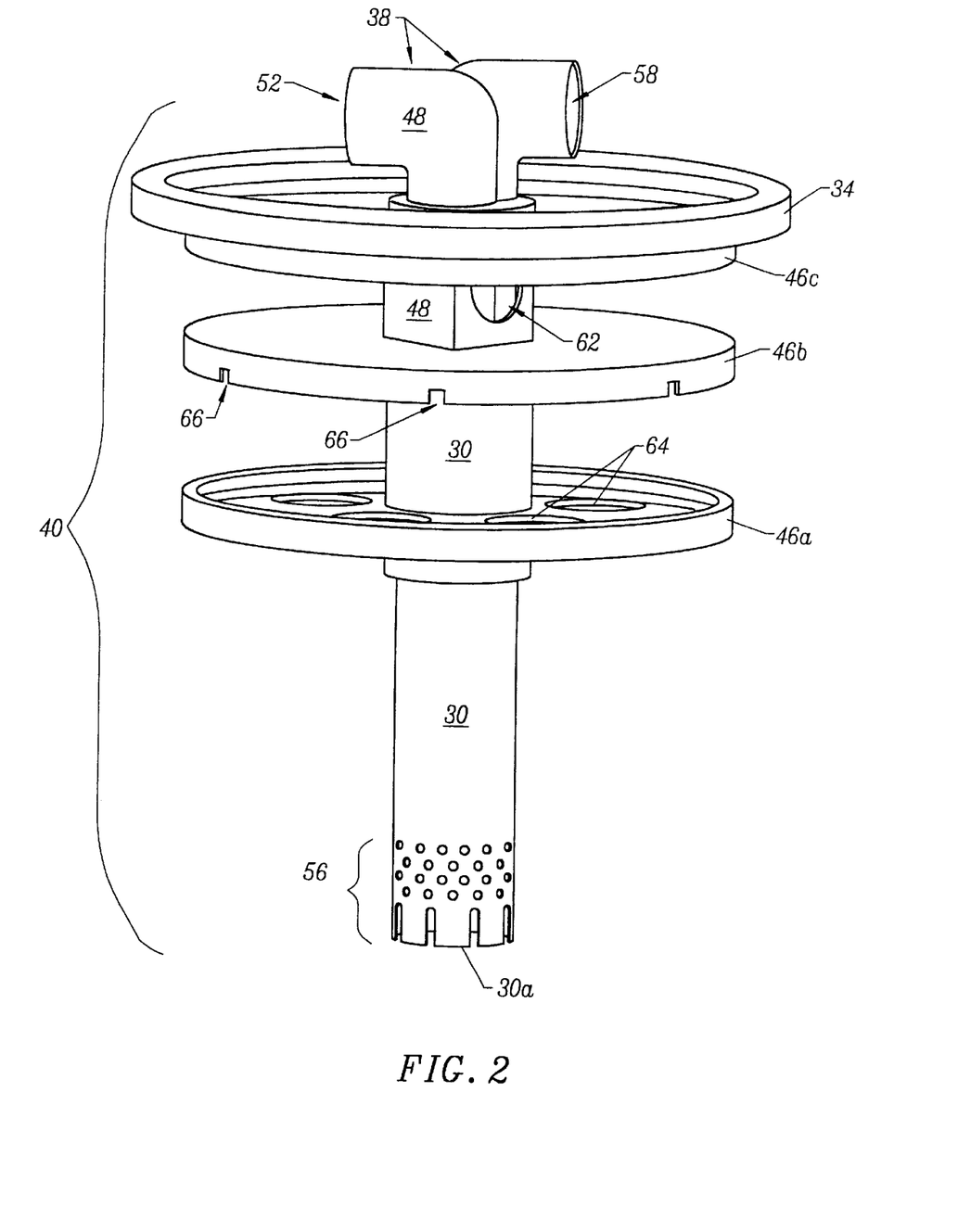
FIG. 2 is a perspective view of the inlet/exhaust pipe portion of the filter shown in FIG. 1.

A pipe/fiber-element assembly 38 includes an inlet/exhaust pipe assembly 40 FIG. 2, a coarse-fiber element 42 FIG. 1, and a fine-fiber element 44, FIG. 1. The inlet exhaust pipe assembly 40 FIG. 2 includes; an inlet pipe 30, an exhaust pipe 48, cover 34, and three fiber-element supports 46a, 46b, 46c, FIG. 2. The inlet pipe 30 has an inlet portal 52, comprising the upper end of said inlet pipe 30 FIG. 3, having a distribution manifold 54 incorporated a predetermined distance proximal the upper end of said inlet pipe 30, said distribution manifold 54 having a plurality of air-flow portals 62 and a diffusing sieve 56 FIG. 2 incorporated proximal the lower end 30a of said inlet pipe 30.

The exhaust pipe 48 is disposed contiguous to and proximal the upper end of said inlet pipe 30, said exhaust pipe 48 and said inlet pipe 30 having mutually parallel linear axes. The exhaust pipe 48 FIG. 3 includes; a closed and sealed lower end 48a, a 90-degree exhaust portal 58 comprising the opposite open end, and an air-flow portal 60 disposed a predetermined distance proximal the closed end and co-extensive with one of the portals 62 in said distribution manifold 54 incorporated in the upper end of said inlet pipe 30.

Figure 3:
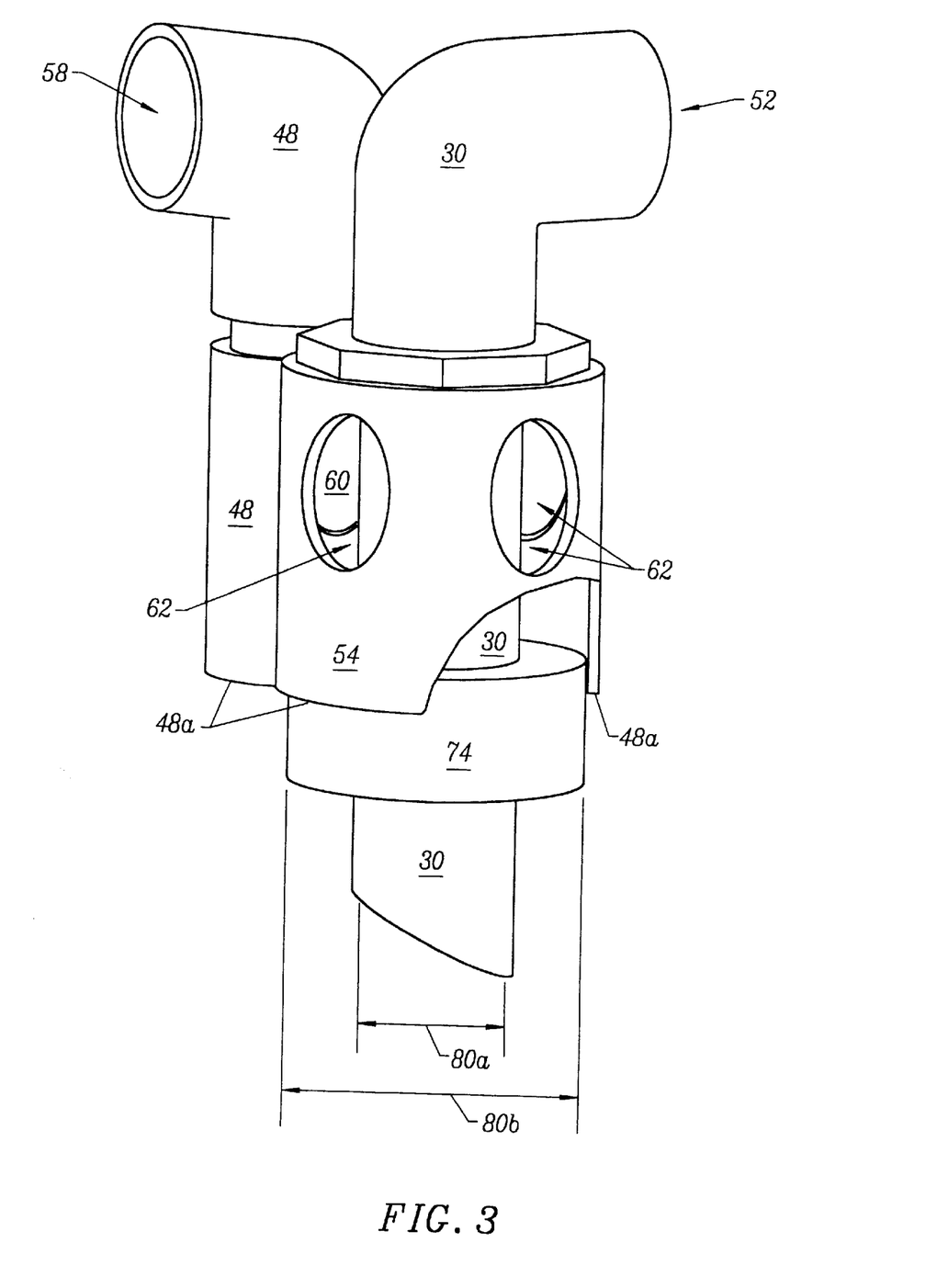
FIG. 3 is a perspective view, partially broken away, showing the vacuum distribution manifold and inlet pipe expansion chamber portion of the filter of FIG. 1.

A first expansion chamber 80a, 80b, FIG. 3 includes; an expansion-chamber top 74 and is disposed co-extensive with and incorporated into the interior of the inlet pipe 30 below the expansion chamber top 74.

The generally circular, first fiber-element support 46a (FIG. 2) is orthogonal to, and concentric with, the linear axis of said inlet pipe 30. The first fiber-element support 46a includes a plurality of portals 36 (FIG. 1) through the thickness dimension thereof, the generally circular pattern of said portals 36 Is concentric with the linear axis of the inlet pipe 30.

The generally circular, second fiber-element support 46b, is orthogonal to and concentric with the linear axis of the inlet pipe 30. The support includes an eccentric, first inlet/exhaust-pipe portal 62, disposed concentrically and a plurality of draining slots 66, through the thickness dimension thereof, are disposed in a generally circular pattern, a predetermined distance proximal the circumference and concentric with the support 46b. The slots 66 are disposed orthogonal to a generally circular, draining groove concentric with the fiber-element Support 46b.

The generally circular, third fiber-element support 46c, is orthogonal to, and concentric with the linear axis of the inlet pipe 30. The third support 46c is also contiguous to, and concentric with the cover 34. The support 46c has an eccentric, second inlet/exhaust-pipe portal.

The generally circular, coarse-fiber element 42 , with a first and second planar surface, is orthogonal to, and concentric with the linear axis of said inlet pipe 30. The first planar surface of said coarse-fiber element 42 is disposed contiguous to, and co-extensive with said first planar surface of said bottom of said filter-element container 28. The second planar surface of said coarse-fiber element is contiguous to and co-extensive with said first fiber-element support 46a.

The generally circular, fine-fiber element 44, with a first and second planar surface is orthogonal to, and concentric with the linear axis of the inlet pipe 30. The fine-fiber element 44 is disposed a predetermined distance proximal the upper end of said inlet/exhaust pipe assembly 40. Said first planar surface of said fine-fiber element 44 is contiguous to and co-extensive with said second fiber-element support 46b. Said second planar surface of said fine-fiber element 44 is contiguous to and co-extensive with said third fiber-element support 46c.

The preferred embodiment consists of; clear polycarbonate containers, covers, and fiber-element supports; inlet and exhaust pipes composed of polyvinyl chloride; filter elements are expanded polyurethane fiber composites.

The method of removing contaminants from an air stream, disclosed in the application include the following steps:

enhancing the physical properties of said liquid reservoir with additives, if needed, introducing said contaminated air stream, through said diffusing sieve 56, into said liquid reservoir 72 and into expansion chamber 26, exposing said contaminated air stream to the liquid surfaces of the interior of the bubbles 73 formed in said liquid reservoir 72, generating and maintaining said aqueous froth 27, above said liquid reservoir 72, by exploiting the dynamic interface between said contaminated air stream in inlet pipe 30 and said liquid reservoir 72, containing said aqueous froth 27 with said saturated, coarse-fiber element 42 disposed a predetermined distance above the surface of said liquid reservoir, saturating said coarse-fiber element 42 continuously, to remove said contaminant from the fibers of said coarse-fiber element 42, and to return said contaminant and the excess liquid to said liquid reservoir, urging said contaminated air stream into contact with the plurality of liquid surfaces on the bubbles in the froth 27, urging said contaminated air stream into contact the wet fibers of said coarse-fiber element 42, resulting in the removal of said contaminate from said air stream, urging said air stream to contact the humidity-moistened surfaces of said fine element 44, resulting In the removal of any remaining contaminate from said air stream.

Said air stream is drawn by partial vacuum through said air filter 20 and is discharged into a vacuum return hose toward a vacuum source.

An operator fills the liquid reservoir 72 to a predetermined level, and connects a vacuum hose containing a contaminated air stream to the inlet portal 52 of inlet pipe 30. The exhaust portal 58 of exhaust pipe 48 is connected to a vacuum hose from a vacuum source, such as a utility vacuum cleaner. The air-filter device 20 removes the contaminate from the air stream before It gets to the vacuum source.

To clean the air-filter device 20, the operator removes the pipe/fiber-element assembly 38. The assembly 38 is sprayed with a hose until the water, draining from the fiber elements 42, 44, runs clear. The operator washes the water reservoir container 24 with the hose, refills the water to a predetermined level, and replaces the pipe/filter element assembly 38. The filter 20 is ready for use.

The air-filter device 20 is positioned in a vacuum line containing a contaminated air stream. The contaminated air stream enters the inlet pipe 30. The air stream is introduced below the surface of the liquid reservoir 72, through a diffusing sieve 56 incorporated near the bottom of the inlet pipe 30. The contaminated air stream is exposed to the water surface during the initial interface with the water and in the plurality of bubbles diffused through the upper reservoir. The majority of the contaminants are removed from the air stream during this initial filtration process. The lower portion of the liquid reservoir 72 remains relatively calm, thereby allowing most of the heavier contaminants to settle out into a sludge layer on the bottom of the liquid reservoir container 24. The turbulence created by the air stream considerably increases the surface area available to remove the contaminants from the air stream, and saturates a coarse-fiber element 42 positioned several centimeters above the water surface.

The contaminated air stream is initially filtered by being exhausted into the liquid reservoir 72. The air stream is drawn through the turbulent environment of the aqueous froth 27 between the liquid reservoir 72 and the saturated filter element 42. The contaminate is removed from the air stream by contact with the Increased surface area of the water in a highly dynamic state. As the gypsum dust contaminates the water reservoir, the surface tension of the water is increased. The increase of surface tension of the water combined with the highly dynamic energy state of the air stream create a froth which fills the area between the water surface and the saturated fiber filter 42 and increases the surface area of the water exponentially. The contaminate is scrubbed from the air stream by contact with the water surface of the froth as the air stream is drawn through the scrubbing chamber 26. The saturated-fiber element 42 effectively contains the froth 27 created in the scrubbing chamber 26, and filters the air stream again as the air stream is drawn through the thickness dimension of the saturated-fiber element 42 and into contact with the wet surfaces of the saturated fiber element 42. Constant saturation of the fiber-element 42 continually flushes the contaminate from the saturated fiber element 42 as the excess water drains back into the liquid reservoir 72. The viscosity of the liquid reservoir remains low long enough for practical use. The majority of the particulate settles out of the water in a sludge on the bottom of the liquid reservoir 24. The decontaminated air stream is then drawn through the radial dimension of a fine-fiber element 44 and returned to the vacuum line.

It is applicant's opinion that the following theories apply to the function of the device as stated. Generally, the method of the application uses the surface tension of a liquid to remove the contaminate from an air stream. The energy transferred at the interface of the air stream and the liquid reservoir is used to generate an exponential number of liquid surfaces throughout the filter device. The contaminate is exposed to the liquid surfaces and removed from the air stream.

Specifically, the method of the application maintains high air stream velocity over the cross-sectional area of the inlet pipe combined with the acceleration of gravity, to urge the contaminate downward into the liquid reservoir. The interface between the air stream and the liquid reservoir is exploited to generate an exponential number of liquid surfaces throughout the filter. The contaminate is exposed to the liquid surfaces on the interior of the bubbles in the liquid reservoir, on the interior and exterior of the bubbles comprising the aqueous froth filter on the saturated fibers of the coarse-fiber element, and on the moist fibers of the fine-fiber element, before the decontaminated air stream is returned to the vacuum source or atmosphere.

The specific design strategy of the air filter is to maintain the velocity and area of the air stream in the vacuum line until the air stream is directed straight down. The contaminated air stream enters a first expansion chamber in the inlet pipe, the velocity of the air stream is reduced, thereby reducing the work (energy/area) available to the air stream to transport massive contaminants. The remaining air stream velocity, the contaminate momentum, and the acceleration due to gravity combine to urge the contaminated air-stream into contact with the liquid bath. The interface with the water surface, inside the inlet pipe, is dynamic, the majority of massive contaminants is released from the air stream at this initial filtration process. The dynamic interface between the air stream and the water surface is controlled by discharging the air stream through a 360-degree diffusing sieve into the water column of the liquid reservoir, thereby maximizing the surface area of the water exposed to the contaminate. Transference of energy from the air stream, to the liquid reservoir generates turbulence in the upper portion of the liquid reservoir. The turbulence is exploited to generate an aqueous froth, as the primary micron/sub-micron filter means; to saturate a fiber mass; as containment means, to limit the expansion of the aqueous froth, and as a filter means, to remove contaminate from the air stream.

The reservoir container functions as the second expansion chamber, distributing the energy of the air stream over the cross-sectional area of the container. The resultant reduction in the velocity of the air stream In relation to the cross-sectional area of the container, releases all but the least massive contaminants into the liquid reservoir at this filtration stage.

Figure 4:
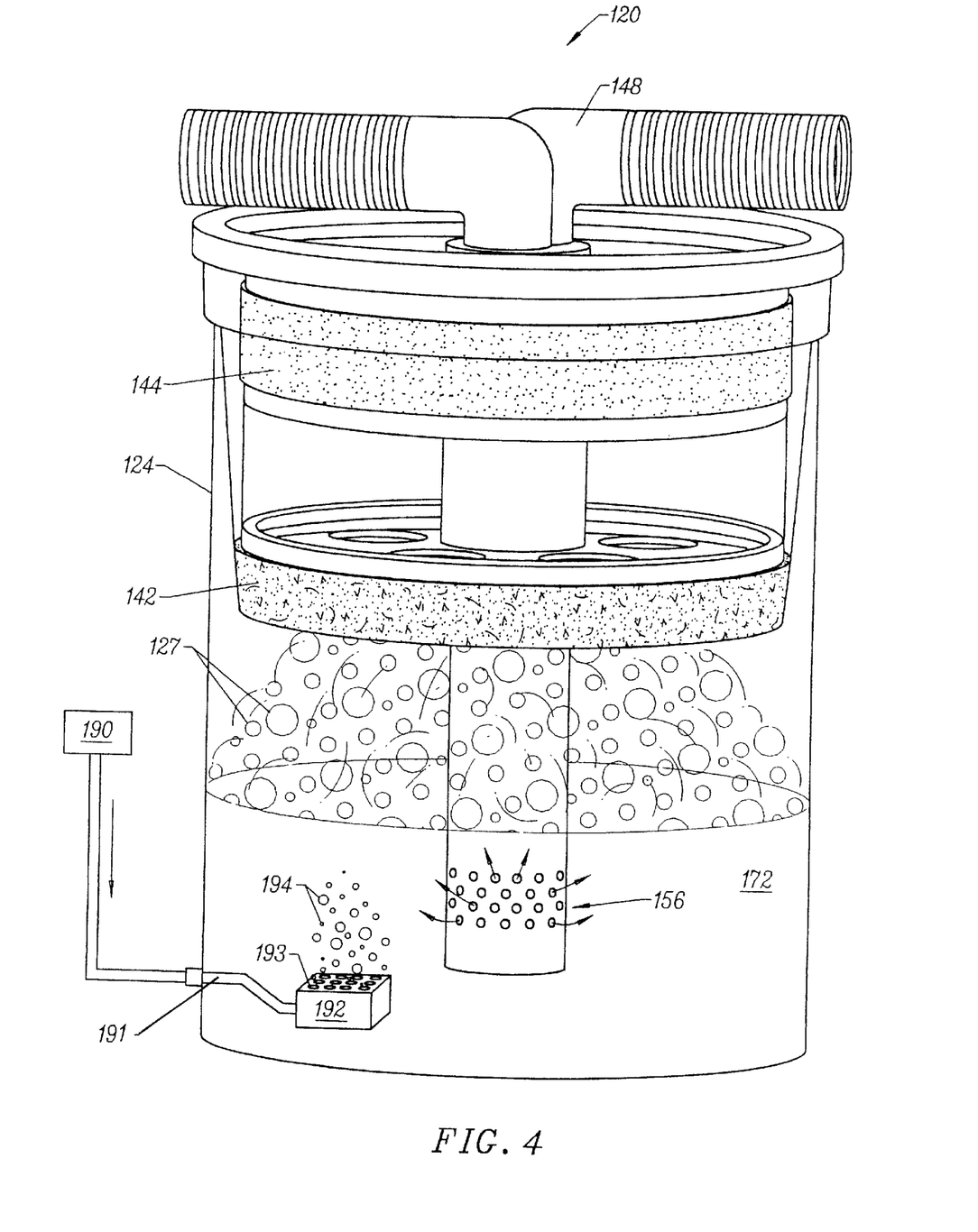
FIG. 4 is a perspective view, partially broken away, of an alternate embodiment of the invention utilized as a pre-filter for a heating and/or air conditioning system.

FIG. 4 illustrates a second embodiment of the invention. In this embodiment, the filter 120 is used as an HVAC (heating, ventilation and air conditioning) pre-filter. This embodiment performs in similar fashion to the embodiment shown in FIGS. 1–3. The added feature of the second embodiment is the use of clean compressed air to create fine bubbles to create the aqueous froth 127. A source 190 of clean compressed air may be an air compressor or a tank of compressed air. A feed line 191 passes through the reservoir container 124 below the surface of water 172. Line 191 connects to an aerator 192 having a plurality of small orifices 193. Orifices 193 create small, fine bubbles 194 from the high pressure, low volume of compressed air. The small, fine, clean bubbles cooperate with sieve 156 to create bubbles and turbulence which in turn creates the aqueous froth 127. Coarse filter element 142 limits the expansion of aqueous froth 127 and provides additional filtering. Fine filter element 144 provides a further filtering stage. The filtered air stream is exhausted through outlet 148 to the HVAC system.

Figure 5:
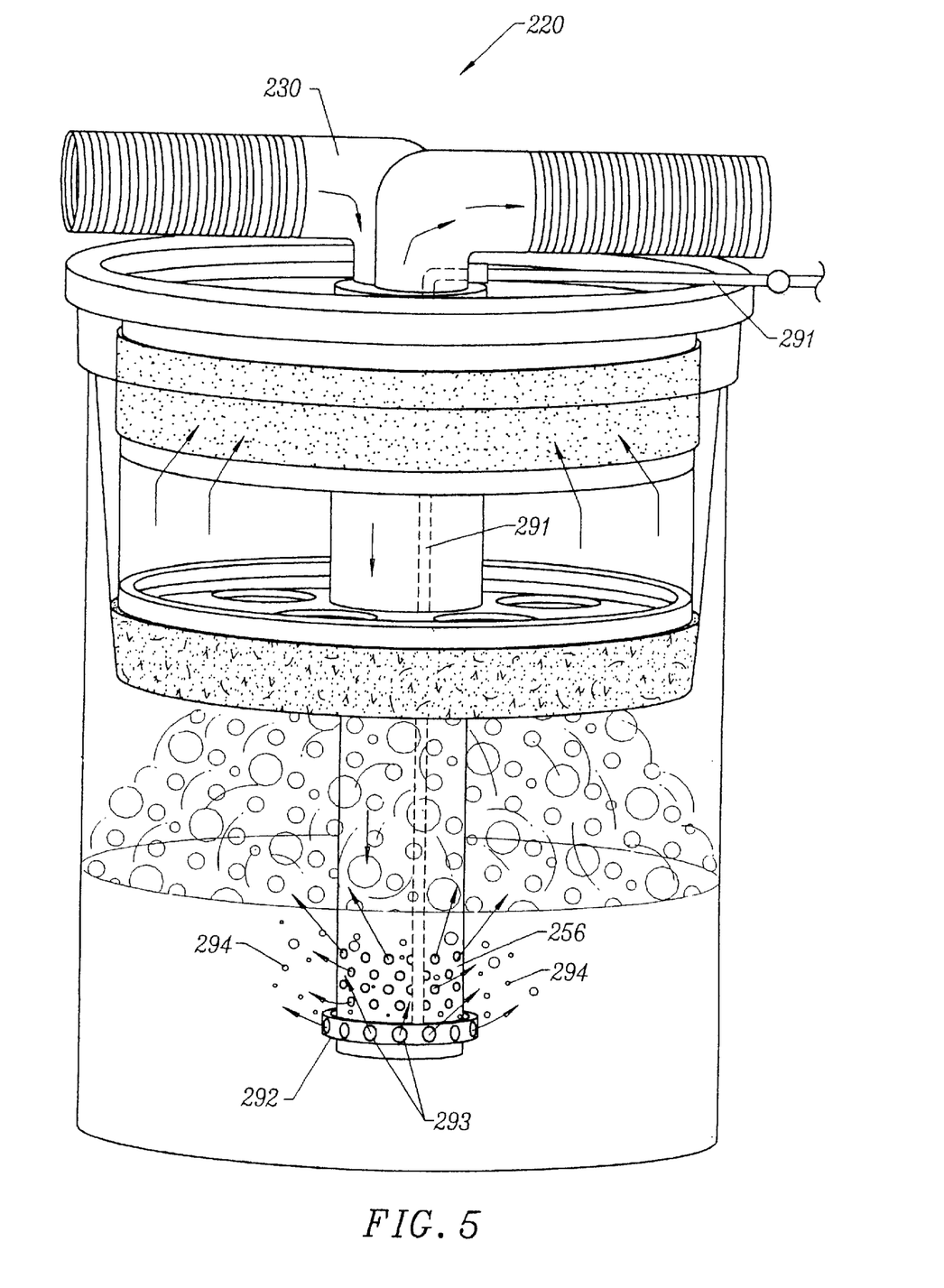
FIG. 5 is a perspective view, partially broken away, of yet another embodiment of the invention utilized as a pre-filter for a heating and/or air conditioning system.

FIG. 5 illustrates a third embodiment of the invention, also intended for use as an HVAC pre-filter. The filter 220 is very similar to filter 120 of FIG. 4, except that a portion of the incoming, contaminated air stream is used to form a source of high pressure compressed air. A supply line 291 enters inlet 230 and connects to aerator 292 located below sieve 256. Aerator 292 has a plurality of small orifices 293 which create fine bubbles 294. The significance of the approach used in this embodiment is that it tends to reduce or eliminate the pressure loss between the incoming and outgoing air stream.

Water soluble contaminants, or additives if necessary, increase the surface tension of the water. The increased surface tension of the water increases the time each bubble exists. The plurality of bubbles are generated faster than the bubbles deteriorate, and an aqueous froth forms, fills the scrubbing chamber, and is maintained and used as the primary filtering surfaces. When the froth reaches the saturated coarse-fiber element, the excess bubbles are absorbed on contact with any water surface in the saturated-fiber element, and an equilibrium is achieved between bubble generation and bubble deterioration. The filtering froth remains at a constant volume. The air stream, carrying only the least massive contaminants against the pull of gravity is drawn by partial vacuum through the aqueous froth of the scrubbing chamber. The contaminate is exposed to an exponential number of filtering surfaces as the air stream is drawn through the bubbles of the froth. Any massive contaminate is removed from the air stream and returned to the liquid reservoir. The air stream and any gaseous contaminants are drawn through the fiber element, and are exposed to the plurality of saturated fibers, any contaminate in the liquid on the fibers is continually rinsed back into the liquid reservoir by the turbulent environment of the scrubbing chamber. The air stream is drawn through the humidity-moistened fibers of the fine-fiber element, scrubbing the air stream a final time. The decontaminated air stream is returned to the vacuum line of the vacuum source.

When the contaminate is not water soluble, additives to the reservoir are utilized to increase the surface tension of the water, thereby, enabling the formation of the froth. When the particulate is contaminated with a residue that is not water soluble, catalysts are selected to act as a solvent to the contaminant. The different properties of the catalysts further enhance the properties of froth and the saturated fiber element for different contaminate applications:

- soap, for contaminate that is not water soluble, contaminated by grease, oil, fireplace or bar-b-que ash,
- soap and bleach, for antibacterial use with organic-allergen laden air stream contaminated by grease or oil, as found in household dust;
- bicarbonate of soda, absorbs odors and neutralizes acid contaminants;
- other specific chemical agents that react with and remove, specific contaminants from an air stream, through covalent bonding or some other chemical process.

The list of additives is representative, not comprehensive, and should not limit the scope of the Invention.

I claim:

1. A method of filtering sub-micron particulate contaminants from a contaminated air stream, comprising the steps:

- passing said contaminated air stream into a contained aqueous solution;
- diffusing and passing said contaminated air stream through said contained aqueous solution;
- generating and continuously maintaining an aqueous froth above said contained aqueous solution and thereby forming a scrubbing chamber;
- passing said contaminated air stream through said aqueous froth in said scrubbing chamber;
- separating said sub-micron particulate contaminants from said air stream onto the surfaces of said aqueous froth by bringing said contaminants into contact with the liquid surfaces of said aqueous froth in said scrubbing chamber;
- transferring said contaminants from the surfaces of said aqueous froth in said scrubbing chamber to said aqueous solution; and
- discharging the decontaminated air stream.

2. The method of claim 1 wherein said aqueous froth is generated and continuously maintained by the flow of said contaminated air stream.

3. The method of claim 1 wherein said contaminated air stream is drawn into said aqueous solution by applying and maintaining a continuous vacuum to said contaminated air stream.

4. The method of claim 3 wherein said decontaminated air stream is discharged under negative relative pressure toward a vacuum source.

5. The method of claim 1 comprising the further step of intentionally constructing and then limiting the amount of aqueous froth to a predetermined volume to perform useful work by removing said contaminants.

* * * * *

UNITED STATES PATENT AND TRADEMARK OFFICE
CERTIFICATE OF CORRECTION

PATENT NO. : 6,616,733 B1
DATED : September 9, 2003
INVENTOR(S) : Roy J. Pellegrin It is certified that error appears in the above-identified patent and that said Letters Patent is hereby corrected as shown below:

<u>Title page,</u>
Item [22], "PCT Filed: July 10, 2001" the filing date should be -- October 4, 2000 --

Signed and Sealed this

Twenty-seventh Day of January, 2004

JON W. DUDAS
*Acting Director of the United States Patent and Trademark Office*